US009676877B2

(12) United States Patent
Hjertberg et al.

(10) Patent No.: US 9,676,877 B2
(45) Date of Patent: Jun. 13, 2017

(54) DISENTANGLED HIGH OR ULTRAHIGH MOLECULAR WEIGHT POLYETHYLENE PREPARED WITH ZIEGLER-NATTA CATALYST

(71) Applicant: Borealis AG, Vienna (AT)

(72) Inventors: Thomas Hjertberg, Kungshamn (SE); Alexandra Romina Albunia, Linz (AT); Yi Liu, Engerwitzdorf (AT); Qizheng Dou, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/021,113

(22) PCT Filed: Feb. 6, 2015

(86) PCT No.: PCT/EP2015/052482
§ 371 (c)(1),
(2) Date: Mar. 10, 2016

(87) PCT Pub. No.: WO2015/121162
PCT Pub. Date: Aug. 20, 2015

(65) Prior Publication Data
US 2016/0340449 A1 Nov. 24, 2016

(30) Foreign Application Priority Data
Feb. 13, 2014 (EP) .................................. 14154934

(51) Int. Cl.
*C08F 10/00* (2006.01)
*C08F 10/02* (2006.01)
*C08L 23/06* (2006.01)

(52) U.S. Cl.
CPC .............. *C08F 10/02* (2013.01); *C08L 23/06* (2013.01); *C08L 2203/18* (2013.01); *C08L 2205/025* (2013.01); *C08L 2207/062* (2013.01); *C08L 2207/068* (2013.01); *C08L 2314/02* (2013.01)

(58) Field of Classification Search
CPC .... C08F 10/02; C08L 23/06; C08L 2207/062; C08L 2207/068; C08L 2314/02
See application file for complete search history.

(56) References Cited

U.S. PATENT DOCUMENTS

| 3,242,150 | A | 3/1966 | Scoggin |
| 3,324,093 | A | 6/1967 | Alleman |
| 3,374,211 | A | 3/1968 | Etal |
| 3,405,109 | A | 10/1968 | Rohlfing |
| 4,582,816 | A | 4/1986 | Miro |
| 5,391,654 | A | 2/1995 | Ahvenainen et al. |
| 2010/0144224 | A1* | 6/2010 | De Weijer et al. ... B29C 55/005 442/1 |
| 2013/0012375 | A1 | 1/2013 | Li et al. |
| 2014/0309385 | A1* | 10/2014 | Wassenaar ............ C07F 7/006 526/126 |
| 2015/0225555 | A1* | 8/2015 | Mather et al. ......... C08L 23/06 525/240 |

FOREIGN PATENT DOCUMENTS

| EP | 0 479 186 A2 | 4/1992 |
| EP | 0 688 794 A1 | 12/1995 |
| EP | 0 810 235 A2 | 12/1997 |
| EP | 0 891 990 A2 | 1/1999 |
| EP | 0 909 769 | 4/1999 |
| EP | 1 310 295 A1 | 5/2003 |
| EP | 1 415 999 A1 | 5/2004 |
| EP | 1 591 460 A1 | 11/2005 |
| EP | 1 441 886 B1 | 2/2013 |
| WO | WO 99/51646 A1 | 10/1999 |
| WO | WO 01/55230 A1 | 8/2001 |
| WO | WO 03/106510 A1 | 12/2003 |
| WO | WO 2004/113057 A1 | 12/2004 |
| WO | WO 2005/118655 A1 | 12/2005 |
| WO | WO 2007/025640 A1 | 3/2007 |
| WO | WO 2009/007045 A1 | 1/2009 |
| WO | WO 2013/034582 A1 | 3/2013 |
| WO | WO 2013/060736 A1 | 5/2013 |
| WO | WO 2013/076733 A2 | 5/2013 |

OTHER PUBLICATIONS

Busico et al.; Alk-1-ene Polymerization in the Presence of a Monocyclopentadienyl Zirconium (IV) Acetamidinate Catalyst: Microstructural and Mechanistic Insights; 28; 1128-1134; 2007.
Castignolles et al.; Detection and quantification of branching in polyacrylates by size exclusion chromatography (SEC) and melt-state 13C NMR spectroscopy; Polymer; 50; 2373-2383; 2009.
Filip et al.; Heteronuclear decoupling under fast MAS by a rotor-synchronized Hahn-echo pulse train; Journal of Magnetic Resonance; 176; 239-243; 2005.
Griffin et al.; Low-load rotor-synchronised Hahn-echo pulse train (RS-HEPT) 1 H decoupling in solid-state NMR: factors affecting MAS spin-echo dephasing times; Mag. Reson. Chern.; 45; S198-S208; 2007.
Heino et al.; Rheological Characterization of Polyethylene Fractions; Theoretical and Applied Rheology; vol. 1; 360-362; 1992.
Heino et al.; The Influence of Molecular Structure on Some Rheological Properties of Polyethylene; Annual Transactions of the Nordic Rheology Society; 1995.

(Continued)

*Primary Examiner* — Nathan M Nutter
(74) *Attorney, Agent, or Firm* — Richard M. Klein; Fay Sharpe LLP (57) ABSTRACT

Disentangled high or ultrahigh molecular weight polyethylene ((U)HMWPE) being produced with a Ziegler-Natta catalyst, characterized by (i) a factor for the normalized elastic modulus $G'_0/G'_P$ of less than 0.95 determined in a dynamic time sweep measurement at 180° C. with constant strain of 0.5% at fixed frequency of 10 rad/s for at least 3600 s, whereby $G'_0$ is the elastic shear modulus measured at t0 directly after melting the sample and $G'_P$ is the maximum plateau modulus.

20 Claims, 4 Drawing Sheets

(56) References Cited

OTHER PUBLICATIONS

Kaye et al.; Definition of Terms Relating to the Non-Ultimate Mechanical Properties of Polymers; Pure and Applied Chemistry; vol. 70; No. 3; 701-754; 1998.
Klimke et al.; Optimisation and Application of Polyolefin Branch Quantification by Melt-State 13C NMR Spectroscopy; Macromolecular Chemistry and Physics; 207; 382-295; 2006.
Lippits et al.; Formation of Entanglements in Initially Disentangled Polymer Melts; Macromolecules; 39; 8882-8885; 2006.
Pandey et al.; Heterogeneity in the Distribution of Entanglement Density during Polymerization in Disentangled Ultrahigh Molecular Weight Polyethylene; Macromolecules; 44; 4952-4960; 2011.
Parkinson et al.; Effect of Branch Length on 13C NMR Relaxation Properties in Molten Poly[ethylene-co-(a-olefin)] Model Systems; Macromolecular Chemistry and Physics; 208; 2128-2133; 2007.
Pollard et al.; Observation of Chain Branching in Polyethylene in the Solid State and Melt via 13C NMR Spectroscopy and Mel NMR Relaxation Time Measurements; Macromolecules; 37; 813-825; 2004.
Randall et al.; A Review of High Resolution Liquid 13Carbon Nuclear Magnetic Resonance Characterizations of Ethylene-Based Polymers; Journal of Macromolecular Science, Part C: Polymer Reviews; vol. 29; No. 2-3; 1989.
Zhou et al.; A new decoupling method for accurate quantification of polyethylene copolymer composition and triad sequence distribution with 13C NMR; Journal of Magnetic Resonance; 187; 225-233; 2007.
International Search Report and Written Opinion of International Application No. PCT/EP2015/052482 dated Apr. 16, 2015.

\* cited by examiner

Figure 1:
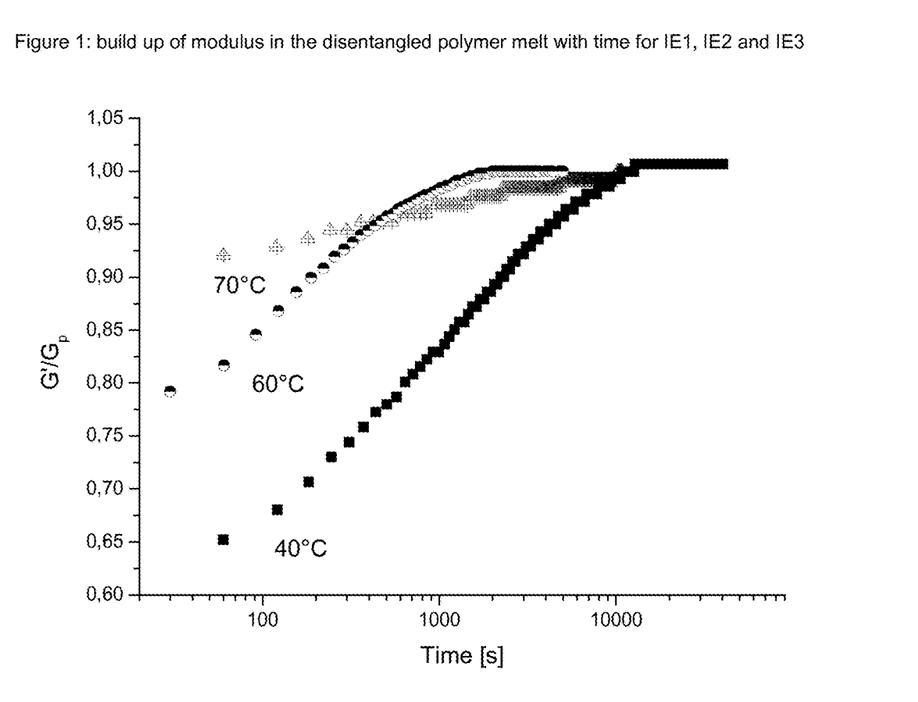

Figure 1: build up of modulus in the disentangled polymer melt with time for IE1, IE2 and IE3

Figure 2:
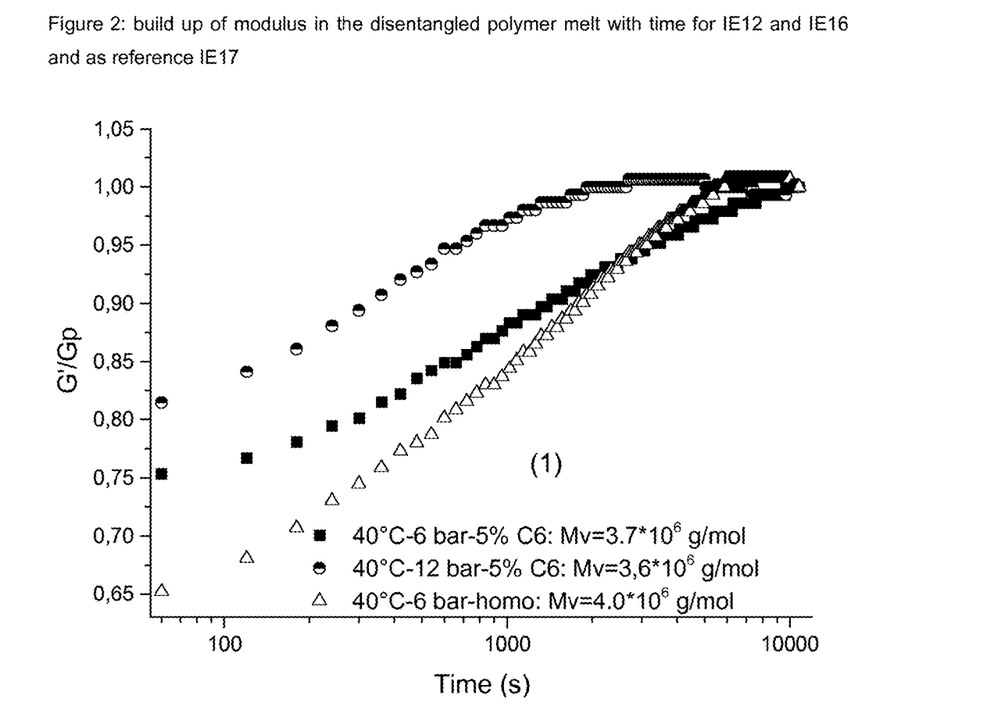

Figure 2: build up of modulus in the disentangled polymer melt with time for IE12 and IE16 and as reference IE17

Figure 3:
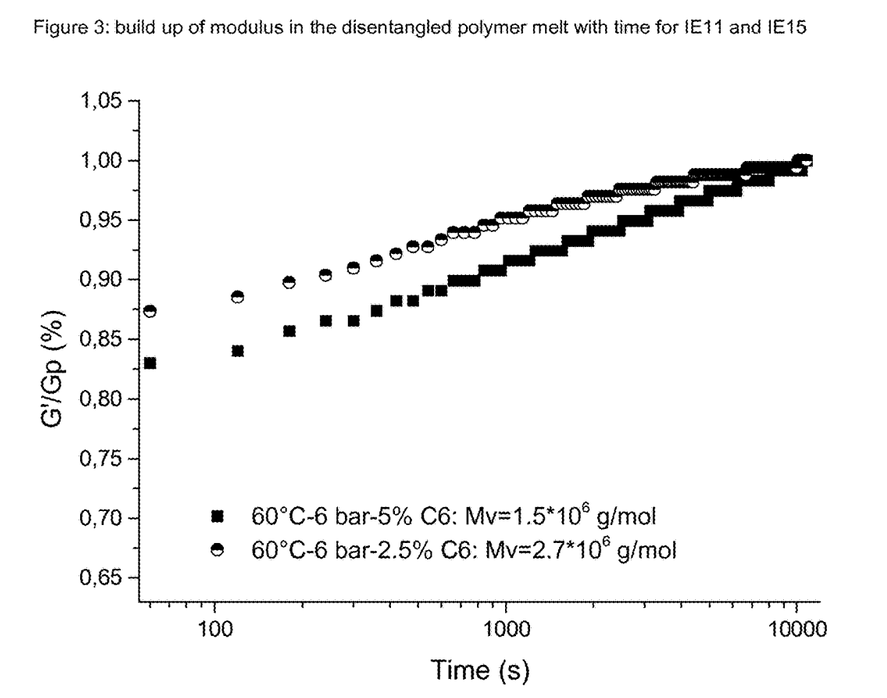

Figure 3: build up of modulus in the disentangled polymer melt with time for IE11 and IE15

Figure 4:
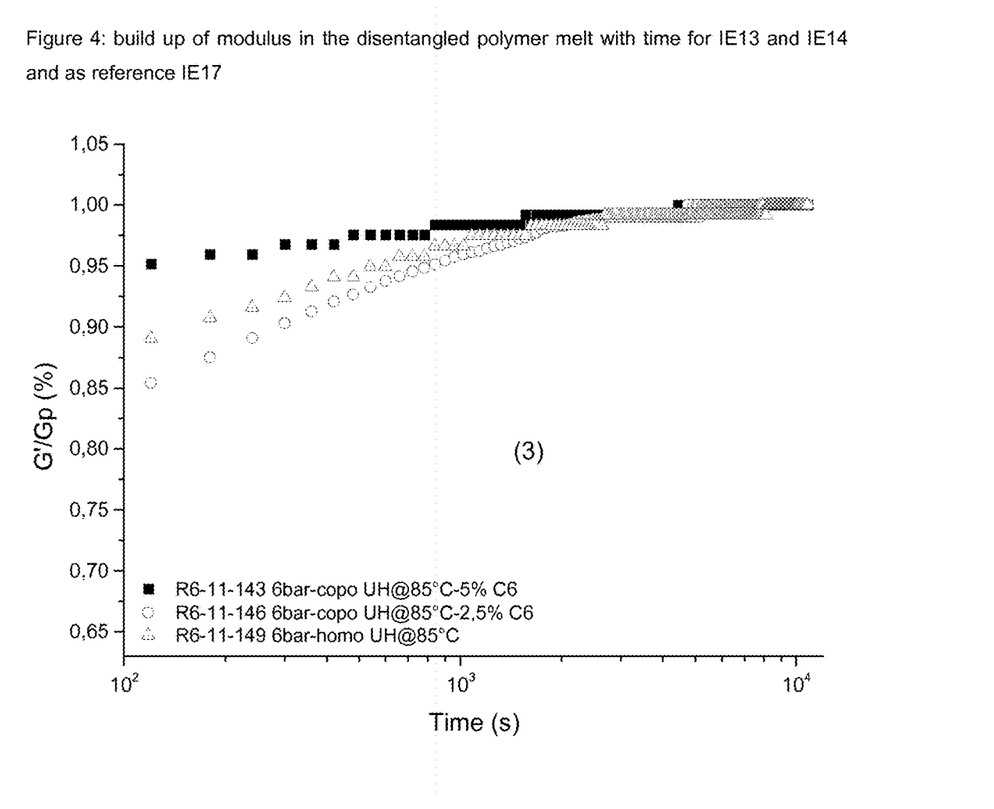

Figure 4: build up of modulus in the disentangled polymer melt with time for IE13 and IE14 and as reference IE17

DISENTANGLED HIGH OR ULTRAHIGH MOLECULAR WEIGHT POLYETHYLENE PREPARED WITH ZIEGLER-NATTA CATALYST

The present invention is related to a disentangled high or ultrahigh molecular weight polyethylene ((U)HMWPE) which is prepared by using a Ziegler Natta catalyst, to its preparation and its use.

(U)HMWPE is a very special class of polyethylene, which is due to its high molecular weight characterized by a unique combination of properties making it suitable for applications where lower molecular weight grades fail.

(U)HMWPE has outstanding physical and mechanical properties such as high abrasion resistance, high impact toughness, good corrosion and chemical resistance, resistance to cyclic fatigue, and resistance to radiation.

However, increased molecular weight of the polymers also adversely affects their processability, mainly due to the reduced number of chain ends and increased number of entanglement per chain, and due to the high melt viscosity, causing poor homogeneity of the processed product obtained from such a high molecular weight material.

The origin of the high melt viscosity and poor processability can be traced back to the entanglements of the high molecular weight polymer chains. High entanglement density imparts excellent mechanical properties in the end application but causes restricted mobility of the polymer chains in the melt during processing. Therefore, lowering the entanglement density of UHMWPE might be an entry to well-processable UHMWPE with enhanced flow characteristics and completely fused products thereof.

Thus, it has been always a quest to find balance between the ease in processing and the acquired mechanical properties.

From literature it is known that using Ziegler Natta catalysts for synthesizing (U)HMWPE results in high entanglement, which worsens the processability of the so produced (U)HMWPE.

For Example WO 2013/076733 describes that the synthesis of UHMWPE using conventional Ziegler Natta catalysts results in high entanglement of the chains because of the drastic reaction conditions used in such reactions. To achieve disentanglement of the polymer chains WO 2013/076733 states that it is imperative that single site catalysts are needed which are highly active and exhibit living nature under milder process conditions.

Also WO 2013/034582 states that normally in the commercially synthesized polymers, where a heterogeneous Ziegler Natta (Z-N) catalyst is used, the crystallization rate is slower than the polymerization rate. Moreover, in a heterogeneous catalytic system the active sites are tethered on a support and are close to each other, leading to a higher probability of finding the neighboring growing chains. This results in the entanglement formation during synthesis.

Furthermore it is described in EP 1441886 that UHMWPE of very low entanglement density is for example obtained if a single-site catalyst is used, like for example a metallocene catalyst.

The present inventors have now surprisingly found, that, contrary to the teaching of the prior art, disentangled high or ultrahigh molecular weight polyethylene ((U)HMWPE) can be obtained in a polymerization process using a Ziegler-Natta catalyst.

The so produced (U)HMWPE is very suitable as e.g. blend partner for HDPE, giving blends of excellent mechanical properties despite the very high molecular weights involved. The blends possess excellent tensile strength, strain at tensile strength, stress at break and strain at break without losses of tensile modulus, making them furthermore ideal for pipe formation.

SUMMARY OF INVENTION

Thus viewed from a first aspect the invention provides a disentangled high or ultrahigh molecular weight polyethylene ((U)HMWPE) being produced with a Ziegler-Natta catalyst, characterized by
(i) a factor for the normalized elastic modulus $G'_0/G'_p$ of less than 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

The disentangled high or ultrahigh molecular weight polyethylene ((U)HMWPE) according to the invention is further characterized by
(i) an intrinsic viscosity of at least 8.0 dl/g
(ii) a nominal viscosity molecular weight (Mv) of at least $1.0*10^6$ g/mol and
(iii) a molecular weight of ($M_w$) of at least $0.5*10^6$ g/mol.

Additionally the disentangled high or ultrahigh molecular weight polyethylene ((U)HMWPE) according to the invention is, in case of being a homopolymer, further characterized by a melting temperature $Tm_1$, measured according to ISO 11357-3 after the first heating run, of >140.0° C.

Viewed from another aspect the invention provides a process for the preparation of the disentangled high or ultrahigh molecular weight polyethylene ((U)HMWPE) as herein before defined comprising polymerization of ethylene, optionally in the presence of a $C_3$-$C_{20}$ alpha olefin comonomer, in a slurry phase reactor in an inert hydrocarbon diluent at a temperature of 10 to 100° C. in the presence of a Ziegler-Natta catalyst and a cocatalyst, but in the absence of hydrogen.

Viewed from a further aspect, the invention is related to the use of the disentangled high or ultrahigh molecular weight polyethylene ((U)HMWPE) as hereinbefore defined, especially in blends with HDPE, being suitable for producing pipes.

DETAILED DESCRIPTION OF INVENTION

The tests for any claimed parameter are given in the "analytical tests" section of the text which precedes the examples.

Wherever the term "molecular weight Mw" is used herein, the weight average molecular weight is meant. Wherever the term "molecular weight Mv" is used herein, the nominal viscosity molecular weight is meant.

The present invention is related to a high or ultrahigh molecular weight polyethylene ((U)HMWPE), which is disentangled, although produced by using a Ziegler-Natta catalyst.

The disentangled high or ultrahigh molecular weight polyethylene ((U)HMWPE) is characterized by a factor for the normalized elastic modulus $G'_0/G'_p$ of less than 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

Preferably the factor $G'_0/G'_p$ is less than 0.90, more preferably less than 0.85 and even more preferably less than 0.80.

The change in the modulus is followed as a function of time and it is assumed that the plateau region is reached for fully entangled material, as described e.g. e.g. by D. Lippits et al. in Macromolecules 2006, 39, 8882-8885 or by A. Pandey et. Al. in Macromolecules, 2011, 44, 4952-4960.

The time sweep measurement method used for determination of $G'_0$ and $G'_p$ is described in detail in the experimental part.

The disentangled high or ultrahigh molecular weight polyethylene ((U)HMWPE) is further characterized by the following parameters:
(i) an intrinsic viscosity of at least 8.0 dl/g, preferably of at least 10 dl/g, up to 40 dl/g, preferably up to 30 dl/g
(ii) a nominal viscosity molecular weight (Mv) of at least $1.0*10^6$ g/mol, preferably of at least $1.2*10^6$ g/mol, up to $6.0*10^6$ g/mol, preferably up to $5.8*10^6$ g/mol and more preferably of at least $1.3*10^6$ g/mol, up to $5.5*10^6$ g/mol.
(iii) The molecular weight ($M_w$) of the UHMW component is at least $0.5*10^6$ g/mol up to $3.0*10^6$ g/mol, preferably at least $0.8*10^6$ g/mol up to $2.8*10^6$ g/mol and more preferably $1.0*10^6$ g/mol up to $2.5*10^6$ g/mol.

Additionally the disentangled high or ultrahigh molecular weight polyethylene ((U)HMWPE) according to the invention is, in case of being a homopolymer, further characterized by a melting temperature $Tm_1$, measured according to ISO 11357-3 after the first heating run, of >140.0° C.

Preferably $Tm_1$ of the homo (U)HMWPE is >140.5° C., more preferably >141.0° C. and most preferably >141.5° C.

The disentangled high or ultrahigh molecular weight polyethylene ((U)HMWPE) furthermore has a complex viscosity, which is an indirect measure of the molecular weight, at a shear stress of 0.05 rad/s at 190° C. ($\eta*_{0.05}$ rad/s) in a range of 1,000,000 Pa·s up to 30,000,000 Pa·s, preferably in the range of 2,000,000 Pa·s up to 28,000,000 Pa·s and more preferably in the range of 3,000,000 Pa·s up to 25,000,000 Pa·s The (U)HMWPE according to the invention has in addition a very low MFR, such as an $MFR_{21}$ of less than 0.5 g/10 min, especially $MFR_{21}$ of less than 0.1 g/10 min, more especially less than 0.05 g/10 min.

The (U)HMW polyethylene of the invention is either an ethylene homopolymer or an ethylene copolymer.

In an (U)HMW polyethylene copolymer, the comonomer present is at least one $C_{3-20}$ olefin. Preferred comonomers are alpha-olefins, especially with 3-10 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred. Ideally only one comonomer is present. The use of hexene is especially preferred.

The comonomer content is up to 2.0 mol %, preferably up to 1.0 mol %, more preferably up to 0.8 mol % and most preferably up to 0.6 mol %. The amount of comonomer is generally tailored so as to achieve the intrinsic viscosity as required in the invention.

The (U)HMW polyethylene is preferably unimodal. This means that it has a single peak on GPC. Ideally it is formed from a single component and is therefore produced in a single manufacturing step.

The (U)HMW polyethylene according to the invention is prepared by a slurry polymerization process using a Ziegler-Natta-catalyst.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica or $MgCl_2$.

The average particle size (D50) of the silica support can be typically from 10 to 100 μm. However, it has turned out that special advantages can be obtained if the support has an average particle size (D50) from 5 to 20 μm, preferably from 5 to 15 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an cocatalyst respectively activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, triisobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used and alkyl aluminium halides of which ethylaluminium dichloride and diethylaluminium chloride are particularly used.

The amount in which the activator is used depends on the specific catalyst and activator. Typically triethylaluminium is used in such an amount that the molar ratio of aluminium to the transition metal, like Al/Ti, is from 1 to 1000, preferably from 3 to 100 and in particular from about 5 to about 30 mol/mol.

The slurry polymerization takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is from 10° C. to 100° C., preferably from 20° C. to 90° C., more preferably from 30° C. to 85° C. and most preferably from 40° C. to 75° C.

The pressure is from 1 to 150 bar, preferably from 10 to 100 bar.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460.

In known slurry polymerization processes hydrogen may be fed into the reactor to control the molecular weight of the polymer as known in the art.

The slurry polymerization process used to prepare the disentangled (U)HMW polyethylene of the present invention is characterized by the absence of hydrogen, thus no hydrogen is fed into the reactor.

The disentangled (U)HMW polyethylenes of the present invention are very suitable as blend partner for HDPE. Such blends can be used to make all manner of articles such as cable sheathings, fibres, films and moulded articles. They are of primary interest in the formation of pipes. Pipes can be manufactured using various techniques such as RAM extrusion or screw extrusion.

It will be appreciated that the preferred features of the polymers of the invention as described herein can all be combined with each other in any way.

The invention will now be described with reference to the following non limiting examples.

EXAMPLES

Experimental Part

Analytical Tests

Melt Flow Rate

The melt flow rate (MFR) is determined according to ISO 1133 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]) and the RSHEPT decoupling scheme {[4], [5]}. A total of 1024 (1k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 3s sites respectively:

$$S=(1/2)*(I_{2S}+I_{3S})$$

The relative content of ethylene was quantified using the integral of the bulk methylene (δ+) signals at 30.00 ppm:

$$E=(1/2)*I_{\delta+}$$

The total ethylene comonomer content was calculated based on the bulk methylene signals and accounting for ethylene units present in other observed comonomer sequences or end-groups:

$$E_{total}=E+(5/2)*B+(3/2)*S$$

The total mole fraction of 1-hexene in the polymer was then calculated as:

$$fH=(H_{total}/(E_{total}+H_{total})$$

The total comonomer incorporation of 1-hexene in mole percent was calculated from the mole fraction in the usual manner:

$$H\ [\text{mol-\%}]=100*fH$$

The total comonomer incorporation of 1-hexene in weight percent was calculated from the mole fraction in the standard manner:

$$H\ [\text{wt.-\%}]=100*(fH*84.16)/((fH*84.16)+((1-fH)*28.05))$$

References

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Reson. 2005, 176, 239.
[5] Griffin, J. M., Tripon, C., Samoson, A., Filip, C., and Brown, S. P., Mag. Res. in Chem. 2007, 45, S1, S198.
[6] Castignolles, P., Graf, R., Parkinson, M., Wilhelm, M., Gaborieau, M., Polymer 50 (2009) 2373.
[7] Zhou, Z., Muemmerle, R., Qiu, X., Redwine, D., Cong, R., Taha, A., Baugh, D. Winniford, B., J. Mag. Reson. 2007, 187, 225.
[8] Busico, V., Carbonniere, P., Cipullo, R., Pellecchia, R., Severn, J., Talarico, G., Macromol. Rapid Commun. 2007, 28, 1128.
[9] J. Randall, Macromol. Sci., Rev. Macromol. Chem. Phys. 1989, C29, 201.

Melting Temperature $Tm_1$

The melting temperature $Tm_1$ is measured according to ISO 11357-3:2011 with a TA Instrument Q200 differential scanning calorimetry device (DSC) on 4-10 mg samples. $Tm_1$ was obtained during the first heating scan of the nascent (U)HMWPE powder between 30° C. and 170° C. at a heating rate of 10° C./min.

Dynamic Time Sweep Experiment

To investigate the entanglement density, synthesized (U)HMWPE powders were first stabilized with 0.25 wt % of IRGANOX B225. The stabilized powders were compression moulded at 200° C. for no more than 20s into discs having diameter of 26 mm and thickness of ~1.8 mm. Time sweep measurements were carried out on a stress/strain controlled Anton Paar MCR501 rheometer with 25 mm diameter parallel plates under nitrogen (inert) atmosphere. The plates were conditioned at 180° C. for at least 30 minutes before inserting the compression moulded samples to ensure thermally stable environment. After a sample was inserted, the plates were closed with a positive normal force to ensure good contact. About 1 minute later, the plates were compressed till the gap is decreased to 1.7 to 2.1 mm. After another 1 minute the time sweep measurement was conducted at 180° C., with an angular frequency of 10 rad/s, a constant strain of 0.5% for about 3600 s or longer.

The change in the modulus was plotted as a function of time as described in Macromolecules 2006, 39, 8882-8885. The starting G' is recorded as $G'_0$ while the ending G' is recorded as $G'_p$. $G'_0/G'_p$ is used to characterize the degree of entanglement. The lower value indicates higher degree of disentanglement. In some cases the modulus plateau does not appear within the test time frame and the real degree of entanglement in such cases is therefore higher than that evaluated by $G'_0/G'_p$.

Molecular Weight

Mw, Mn and MWD are measured by Gel Permeation Chromatography (GPC) according to the following method:

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \tag{1}$$

$$M_w = \frac{\sum_{i=1}^{N} (A_i \times M_i)}{\sum_{i=1}^{N} A_i} \tag{2}$$

$$M_z = \frac{\sum_{i=1}^{N} (A_i \times M_i^2)}{\sum_{i=1}^{N} (A_i/M_i)} \tag{3}$$

For a constant elution volume interval $\Delta V_i$, where $A_i$, and $M_i$, are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19 \times 10^{-3} \text{ mL/g}, \alpha_{PS}=0.655$$

$$K_{PE}=39 \times 10^{-3} \text{ mL/g}, \alpha_{PE}=0.725$$

$$K_{PP}=19 \times 10^{-3} \text{ mL/g}, \alpha_{PP}=0.725$$

A third order polynomial fit was used to fit the calibration data. All samples were prepared in the concentration range of 0.15-0.3 mg/ml and dissolved at 160° C. for 3 hours for PE under continuous gentle shaking.

Nominal viscosity molecular (Mv) is calculated from the intrinsic viscosity [η] according to ASTM D 4020-05 Mv=5.37×10$^4$×[η]$^{1.37}$ Intrinsic viscosity is measured according to DIN EN ISO 1628 (1998) in Decalin at 135° C.

The reduced viscosity (also known as viscosity number), $\eta_{red}$, and intrinsic viscosity, [η], of polyethylenes and polypropylenes are determined according to the ISO 1628-3: "Determination of the viscosity of polymers in dilute solution using capillary viscometers".

Relative viscosities of a diluted polymer solution (~1 mg/ml) and of a pure solvent (decahydronaphthalene) are determined in an automated capillary viscometer (Lauda PVS1) equipped with 4 Ubbelohde capillaries placed in a thermostatic bath filled with silicone oil. The bath temperature is maintained at 135° C. Each measuring stand is equipped with electronics to control pump, valve function, time measurement, meniscus detection and has a magnetic stirrer. The sample is weighed out and directly placed into the capillary. The capillary is filled with the exact volume of solvent by use of an automatic pipette. The sample is dissolved with constant stirring until complete dissolution is achieved (typically within 60-90 min).

The efflux time of the polymer solution as well as of the pure solvent are measured several times until three consecutive readings do not differ for more than 0.1 s (standard deviation).

The relative viscosity of the polymer solution is determined as the ratio of averaged efflux times in seconds obtained for both, polymer solution and solvent:

$$\eta_{rel} = \frac{t_{solution} - t_{solvent}}{t_{solvent}} \text{[dimensionless]}$$

Reduced viscosity ($\eta_{red}$) is calculated using the equation:

$$\eta_{red} = \frac{t_{solution} - t_{solvent}}{t_{solvent} * C} \text{[dl/g]}$$

where C is the polymer solution concentration at 135° C.:

$$C = \frac{m}{V\gamma}.$$

and m is the polymer mass, V is the solvent volume, and γ is the ratio of solvent densities at 20° C. and 135° C. ($\gamma = \rho_{20}/\rho_{135} = 1.107$).

The calculation of intrinsic viscosity [η] is performed by using the Schulz-Blaschke equation from the single concentration measurement:

$$[\eta] = \frac{\eta_{red}}{1 + K + C + \eta_{red}}$$

where K is a coefficient depending on the polymer structure and concentration. For calculation of the approximate value for [η], K=0.27.

Complex Viscosity η*0.05

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm. Five measurement points per decade are made.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; ω is the angular frequency; δ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0} \cos\delta \text{[Pa]} \quad (3)$$

$$G'' = \frac{\sigma_0}{\gamma_0} \sin\delta \text{[Pa]} \quad (4)$$

$$G^* = G' + iG'' \text{[Pa]} \quad (5)$$

$$\eta^* = \eta' - i\eta'' \text{[Pa·s]} \quad (6)$$

$$\eta' = \frac{G''}{\omega} \text{[Pa·s]} \quad (7)$$

$$\eta'' = \frac{G''}{\omega} \text{[Pa·s]} \quad (8)$$

The values of storage modulus (G'), loss modulus (G"), complex modulus (G*) and complex viscosity (η*) were obtained as a function of frequency (ω).

Thereby, e.g. $\eta_{0.05rad/s}$ (eta*$_{0.05rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

References

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

EXAMPLES

Catalyst (A) Preparation

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1.5/1.4/0.8 (mol/kg silica).

Catalyst (B)

As catalyst (B) Lynx 200 catalyst ($MgCl_2$-supported) supplied by BASF was used Polymerization of (U)HMWPE Used in Inventive Examples 1-17

Unimodal slurry copolymerization was carried out in a 5.3 L bench scale reactor and can be described as follows:

The reactor was operated with the SIEMENS SIMATIC BATCH process control system using WIN CC as process flow display software. All catalyst and co-catalyst components were stored in a glovebox. Special designed metal tubes with Swagelok quick connects have been used to inject the catalyst in the reactor.

Into the stirred 5.3 litre batch reactor maintained at a temperature of 23° C. 850 g propane diluent were introduced and triethylaluminium (TEA) as a cocatalyst was introduced so that the ratio of Al/Ti was 15 for catalyst (A) and 3.7 for catalyst (B).

For Examples IE11-IE16 Diethyl aluminium chloride (DEAC) was used as cocatalyst with a ratio of Al/Ti of 15.

Then the temperature was raised to the actual polymerization temperature and catalyst was added.

The polymerization conditions are summarized in table 1

The polymerization was interrupted by venting the hydrocarbons from the reactor.

No hydrogen was added during polymerization.

TABLE 1

Polymerization parameters for producing (U)HMWPE

| IE | catalyst | Amount of Catalyst (mg) | T (° C.) | $C_2$ (bar) | $C_6/C_2$ cont feed (wt %) | Polymerization time (min) | Production rate (kg/h) |
|---|---|---|---|---|---|---|---|
| 1 | A | 37.8 | 60 | 5 | 0 | 116 | 0.25 |
| 2 | A | 37.8 | 70 | 5 | 0 | 71 | 0.38 |
| 3 | A | 37.6 | 40 | 4 | 0 | 120 | 0.06 |
| 4 | B | 362.3 | 80 | 6 | 0 | 20 | 1.22 |
| 5 | B | 361.8 | 60 | 6 | 0 | 24 | 0.95 |
| 6 | B | 363.2 | 50 | 6 | 0 | 35 | 0.61 |
| 7 | B | 364.2 | 40 | 6 | 0 | 48 | 0.40 |
| 8 | B* | 95.3 | 50 | 3 | 0 | 40 | 0.11 |
| 9 | B* | 99.6 | 50 | 3 | 0 | 96 | 0.15 |
| 10 | B* | 98.7 | 50 | 1.5 | 0 | 115 | 0.09 |
| 11 | A | 75 | 60 | 6 | 2.5 | 40 | 0.12 |
| 12 | A | 75 | 40 | 6 | 5 | 193 | 0.02 |
| 13 | A | 75.2 | 85 | 6 | 5 | 26 | 0.47 |
| 14 | A | 75.3 | 85 | 6 | 2.5 | 25 | 0.47 |
| 15 | A | 75 | 60 | 6 | 5 | 52 | 0.11 |
| 16 | A | 75.9 | 40 | 12 | 5 | 182 | 0.03 |
| 17 | A | 75.0 | 85 | 6 | 0 | 21 | 0.42 |

IE . . . Inventive Example
*For Examples IE8, IE9 and IE10 the ratio of Al/Ti was 14, 13.4, respectively 13.6

The so prepared (U)HMWPE had the following properties as shown in Table 2:

| IE | IV (dl/g) | Mv (g/mol) | Mw (g/mol) | $\eta^*_{0.05}$ (Pa · s) | C6 (mol %) | $G'_0/G'_p$ | $Tm_1$ (° C.) |
|---|---|---|---|---|---|---|---|
| 1 | 17.8 | 2,700,000 | 1,430,000 | 11,000,000 | 0 | 0.79 | 142.5 |
| 2 | n.m. | n.m. | 1,180,000 | 5,600,000 | 0 | 0.92 | 141.6 |
| 3 | 24.4 | 4,280,000 | 2,120,000 | 22,700,000 | 0 | 0.65 | 142.3 |
| 4 | 12.7 | 1,750,000 | 1,086,000 | 4,920,000 | 0 | 0.91 | 140.8 |
| 5 | 18.9 | 3,010,000 | 1,587,000 | 8,538,000 | 0 | 0.88 | 142.9 |
| 6 | n.m. | n.m. | 1,920,000 | 7,700,000 | 0 | 0.87 | 143.2 |
| 7 | 29.0 | 5,400,000 | 2,110,000 | 11,800,000 | 0 | 0.79 | 143.2 |
| 8 | n.m | n.m. | 1,275,000 | 1,615,000 | 0 | 0.54 | 143.2 |
| 9 | n.m. | n.m. | 1,333,000 | 8,742,000 | 0 | 0.39 | 142.9 |

-continued

| IE | IV (dl/g) | Mv (g/mol) | Mw (g/mol) | $\eta^*_{0.05}$ (Pa·s) | C6 (mol %) | $G'_0/G'_p$ | $Tm_1$(° C.) |
|---|---|---|---|---|---|---|---|
| 10 | n.m. | n.m. | 1,918,000 | 9,715,000 | 0 | 0.47 | 143.3 |
| 11 | 17.5 | 2,720,000 | n.d. | n.d. | <0.07 | 0.87 | 141.4 |
| 12 | 22.2 | 3,760,000 | 1,696,000 | 20,789,000 | <0.07 | 0.75 | 142.8 |
| 13 | 10.7 | 1,381,000 | 955,000 | 4,990,000 | 0.2 | 0.94 | 137.3 |
| 14 | 11.9 | 1,596,000 | 840,000 | n.d. | 0.07 | 0.82 | 139.6 |
| 15 | 11.4 | 1,515,000 | 1,287,000 | n.d. | <0.07 | 0.83 | 141.1 |
| 16 | 21.5 | 3,604,000 | n.d. | n.d. | <0.07 | 0.81 | 142.5 |
| 17 | 13.9 | 1,986,000 | n.d. | n.d. | 0 | 0.87 | 141.0 | n.m. . . . not measurable
n.d. . . . not measured

In FIG. 1 the build up of modulus in the disentangled polymer melt with time for IE1, IE2 and IE3 are shown. It can be seen in this FIG. 1 that polymerization at the lowest temperature (40° C.) creates the least entanglement (lowest $G'_0/G'_p$)

In FIG. 2 the build up of modulus in the disentangled polymer melt with time for IE12 and IE16 (Copolymer, polymerization temperature 40° C.) and as reference IE17 are shown FIG. 3 shows the build up of modulus in the disentangled polymer melt with time for IE11 and IE15. (Copolymer, polymerization temperature 60° C.)

FIG. 4 shows the build up of modulus in the disentangled polymer melt with time for IE13 and IE14 (Copolymer, polymerization temperature 85° C.) and as reference IE17.

From FIGS. 2 to 3 it can be seen that when $C_6$ was fed during the 40° C.'s polymerization, UHMWPE with certain amount of disentanglement could also be prepared. The My of the final UHMWPE slightly decreased and the $G'_0/G'p$ value also increased which indicated the increase of entanglement.

Furthermore it can be seen that the disentanglement was also detected from the samples prepared with feeding of $C_6$ at 60° C. Since the plateau in the time sweep measurements of both the sample with 5 wt % and 2.5 wt % $C_6$ have not been reached, the $G'_0/G'p$ of the samples containing $C_6$ should have even lower starting points of $G'_0/G'p$ which indicate more disentanglement.

When the polymerization is proceeded at higher temperature (85° C.), the starting $G'_0/G'p$ of the sample prepared with adding of 2.5 wt % $C_6$ is still below 0.85 which indicates even more disentanglement than that of the sample prepared under same temperature without feeding $C_6$, or similar disentanglement as that of the sample prepared under 60° C. with adding of 5 wt % $C_6$.

The invention claimed:

1. A disentangled high or ultrahigh molecular weight polyethylene ((U)HMWPE) being produced with a Ziegler-Natta catalyst, characterized by
   (i) a factor for the normalized elastic modulus $G'_0/G'_p$ of less than 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

2. The disentangled high or ultrahigh molecular weight polyethylene according to claim 1, being further characterized by
   (i) an intrinsic viscosity of at least 8.0 dl/g
   (ii) a nominal viscosity molecular weight (Mv) of at least $1.0*10^6$ g/mol and
   (iii) a molecular weight of ($M_w$) of at least $0.5*10^6$ g/mol.

3. The disentangled high or ultrahigh molecular weight polyethylene according to claim 1, wherein the polyethylene is either a homopolymer or a copolymer with up to 2.0 mol % of a $C_3$-$C_{20}$-alpha olefin comonomer.

4. The disentangled high or ultrahigh molecular weight polyethylene according to claim 3, further characterized by being a homopolymer with a melting temperature $Tm_1$, measured according to ISO 11357-3 after the first heating run, of >140.0° C.

5. The disentangled high or ultrahigh molecular weight polyethylene according claim 1, wherein the factor for the normalized elastic modulus $G'_0/G'_p$ is less than 0.90.

6. The disentangled high or ultrahigh molecular weight polyethylene according to claim 2, wherein the polyethylene has
   (i) an intrinsic viscosity of at least 10.0 dl/g,
   (ii) a nominal viscosity molecular weight (Mv) of at least $1.2*10^6$ g/mol and
   (iii) a molecular weight of ($M_w$) of at least $0.8*10^6$ g/mol.

7. The disentangled high or ultrahigh molecular weight polyethylene according to claim 4, wherein the polyethylene has a melting temperature $Tm_1$, measured according to ISO 11357-3 after the first heating run, of >140.5° C.

8. The disentangled high or ultrahigh molecular weight polyethylene according to claim 1, wherein the polyethylene has a a complex viscosity $\eta^*_{0.05}$ at a shear stress of 0.05 rad/s at 190° C. in the range of 1,000,000 Pa·s to 30,000,000 Pa·s.

9. A process for the preparation of a disentangled high or ultrahigh molecular weight polyethylene characterized by (i) a factor for the normalized elastic modulus $G'_0/G'_p$ of less than 0.95 determined in a dynamic time sweep measurement at 180° C. with constant stain of 0.5% at fixed frequency of 10 rad/s for at least 3600s, whereby $G'_0$ is the elastic shear modulus measured at $t_0$ directly after melting the sample and $G'_p$ is the maximum plateau modulus, the process comprising:
   polymerizing ethylene, optionally in the presence of a $C_3$-$C_{20}$ alpha olefin comonomer, in a slurry phase reactor in an inert hydrocarbon diluent at a temperature of 10 to 100° C. in the presence of a Ziegler-Natta catalyst and a cocatalyst, but in the absence of hydrogen.

10. The process according to claim 9, wherein the inert hydrocarbon diluent is a $C_1$-$C_4$ hydrocarbon or a mixture therefrom.

11. The process according to claim 9, wherein the temperature is 30 to 85° C.

12. A method for the producing a pipe comprising:
   extruding a polyethylene blend comprising a disentangled high or ultrahigh molecular weight polyethylene and a high density polyethylene;

wherein the disentangled high or ultrahigh molecular weight polyethylene is produced with a Ziegler-Natta catalyst and characterized by (i) a factor for the normalized elastic modulus $G'_0/G'_p$ of less that 0.95 determined in a dynamic time sweep measurement at 180° C. with constant strain of 0.5% at fixed frequency of 10 rad/s for at least 3600s, whereby $G'_0$ is the elastic shear modulus measured at $t_0$ directly after melting the sample and $G'_p$ is the maximum plateau modulus.

13. The disentangled high or ultrahigh molecular weight polyethylene according to claim 2, wherein the polyethylene has a complex viscosity $\eta^*_{0.05}$ at a shear stress of 0.05 rad/s at 190° C. in the range of 1,000,000 Pa·s to 30,000,000 Pa·s.

14. The process according to claim 10, wherein the temperature is 30 to 85° C.

15. A method for the production of an article comprising:
blending a disentangled high or ultrahigh molecular weight polyethylene and a high density polyethylene;
wherein the disentangled high or ultrahigh molecular weight polyethylene is produced with a Ziegler-Natta catalyst, characterized by
(i) a factor for the normalized elastic modulus $G'_0/G'_p$ of less than 0.95 determined in a dynamic time sweep measurement at 180° C. with constant strain of 0.5% at fixed frequency of 10 rad/s for at least 3600s, whereby $G'_0$ is the elastic shear modulus measured at to directly after melting the sample and $G'_p$ is the maximum plateau modulus;
(ii) an intrinsic viscosity of at least 8.0 dl/g;
(iii) a nominal viscosity molecular weight (Mv) of at least $1.01*10^6$ g/mol; and
(iv) a molecular weight of ($M_w$) of at least $0.5*10^6$ g/mol.

16. The disentangled high or ultrahigh molecular weight polyethylene according claim 1, wherein the factor for the normalized elastic modulus $G'_0/G'_p$ is less than 0.85.

17. The disentangled high or ultrahigh molecular weight polyethylene according to claim 4, wherein the polyethylene has a melting temperature $Tm_1$, measured according to ISO 11357-3 after the first heating run, of >141.0° C.

18. The disentangled high or ultrahigh molecular weight polyethylene according to claim 1, wherein the factor for the normalized elastic modulus $G'_0/G'_p$ is less than 0.80.

19. The disentangled high or ultrahigh molecular weight polyethylene according claim 1, wherein the polyethylene has a nominal viscosity molecular weight (Mv) within a range of from $1.3*10^6$ g/mol to $5.5*10^6$ g/mol.

20. The disentangled high or ultrahigh molecular weight polyethylene according claim 1, wherein the polyethylene has a molecular weight of (Mw) within a range of from $1.01*10^6$ g/mol to $2.5*10^6$ g/mol.

* * * * *